US008526295B2

(12) United States Patent
Lin et al.

(10) Patent No.: US 8,526,295 B2
(45) Date of Patent: Sep. 3, 2013

(54) METHOD, SYSTEM AND DEVICE FOR BEAM SHAPING TRANSMISSION

(75) Inventors: Yanan Lin, Beijing (CN); Shiqiang Suo, Beijing (CN); Yu Ding, Beijing (CN); Guojun Xiao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 212 days.

(21) Appl. No.: 12/995,060

(22) PCT Filed: May 26, 2009

(86) PCT No.: PCT/CN2009/000594
§ 371 (c)(1),
(2), (4) Date: Feb. 2, 2011

(87) PCT Pub. No.: WO2009/143710
PCT Pub. Date: Dec. 3, 2009

(65) Prior Publication Data
US 2011/0122837 A1    May 26, 2011

(30) Foreign Application Priority Data
May 27, 2008    (CN) .......................... 2008 1 0113008

(51) Int. Cl.
*H04J 11/00*      (2006.01)
(52) U.S. Cl.
USPC ........... 370/203; 370/282; 370/302; 370/329; 370/334
(58) Field of Classification Search
USPC ................. 370/329, 203, 282, 302, 334, 337, 370/344, 343; 455/436; 375/260
See application file for complete search history.

(56) References Cited

U.S. PATENT DOCUMENTS

| | | | | |
|---|---|---|---|---|
| 7,466,684 | B2* | 12/2008 | Chang | 370/350 |
| 7,986,681 | B2* | 7/2011 | Astely et al. | 370/341 |
| 8,270,375 | B2* | 9/2012 | Ylitalo | 370/334 |
| 2003/0117980 | A1* | 6/2003 | Kim et al. | 370/332 |
| 2005/0201319 | A1* | 9/2005 | Lee et al. | 370/321 |
| 2009/0016461 | A1* | 1/2009 | Jitsukawa et al. | 375/267 |
| 2009/0232243 | A1* | 9/2009 | Tsuboi et al. | 375/267 |

FOREIGN PATENT DOCUMENTS

EP         1158709       * 11/2001

* cited by examiner

*Primary Examiner* — Ricky Ngo
*Assistant Examiner* — Dewanda Samuel
(74) *Attorney, Agent, or Firm* — Nixon Peabody LLP (57) ABSTRACT

The present invention discloses a method for beam forming transmission, comprising the following steps: the eNB mapping the downlink data of the user and the UE-specific reference signals carried in the DwPTS Field for beam forming transmission according to the preset mapping structure, and performing the beam forming process; the eNB performing the resource mapping on results of the beam forming process result, primary synchronization signal, control signaling, Cell specific reference signal and other user data to form the DwPTS Field data; and the eNB sending the DwPTS Field data to the UE. The present invention further discloses a system and a corresponding device for beam forming transmission. The present invention can realize beam forming transmission in the Special Field DwPTS and improve the performance of the system without introducing a new user UE-specific reference signal mapping structure, which is simple to be realized.

9 Claims, 8 Drawing Sheets

METHOD, SYSTEM AND DEVICE FOR BEAM SHAPING TRANSMISSION

CROSS REFERENCE TO RELATED APPLICATIONS

This application is a U.S. National stage of International Application No. PCT/CN2009/000594, filed May 26, 2009, which is related to and claims priority to Chinese Patent Application No. 200810113008.3, filed May 27, 2008, which is incorporated entirely herein by reference.

TECHNICAL FIELD

The present invention relates to the mobile communication field, in particular, to the field of multi-antenna technology of mobile communication.

BACKGROUND OF THE INVENTION

The multi-antenna technology in the physical layer has become one of the key technologies in the next generation wireless communication system. The multi-antenna technology has a lot of advantages, for instance, the multiplexing gain of the multi-antenna is used for expanding the throughput of the system, the diversity gain of the multi-antenna is utilized for improving the performance of the system, and the directivity gain of the antenna is adopted for distinguishing users to eliminate interference between the users, etc. The LTE (Long Term Evolution) system in the 3GPP ($3^{rd}$ Generation Partnership Project) supports a plurality of MIMO (Multiple-Input Multiple-Output) technologies such as the transmission diversity, spatial multiplexing technology and beam forming, etc.

Figure 1:
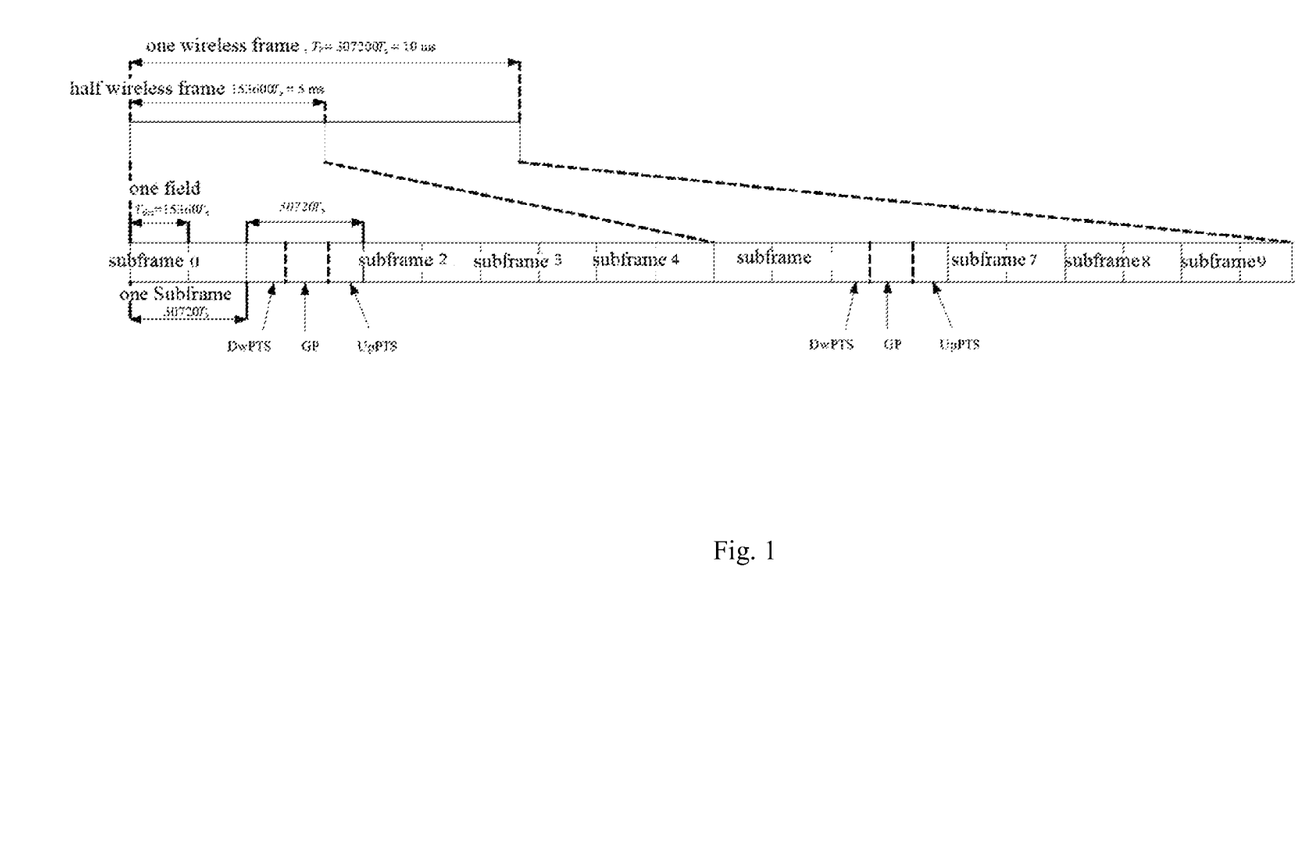
FIG. 1 is a schematic view of the TDD frame structure.

Currently, both the frame structures of FDD (Frequency Division Duplex) and TDD (Time Division Duplex) in the LTE use the Subframe structure of 1 ms, as shown in FIG. 1, a schematic view of the TDD frame structure, the half-frame of one TDD wireless frame is formed by five Subframes each with 1 ms comprising two Slots of 0.5 ms.

In the system with 5 ms downlink-to-uplink switch-point periodicity, each half-frame includes four Subframes with a length of 1 ms and a special subframe with three Fields: DwPTS, GP and UpPTS. The total length of the three Special Fields is 1 ms. As to the system with 10 ms downlink-to-uplink switch-point periodicity, the first half-frame includes four Subframes with a length of 1 ms and a special subframe with three Fields: DwPTS, GP and UpPTS, and the second half-frame only has five Subframes with a length of 1 ms.

Figure 2:
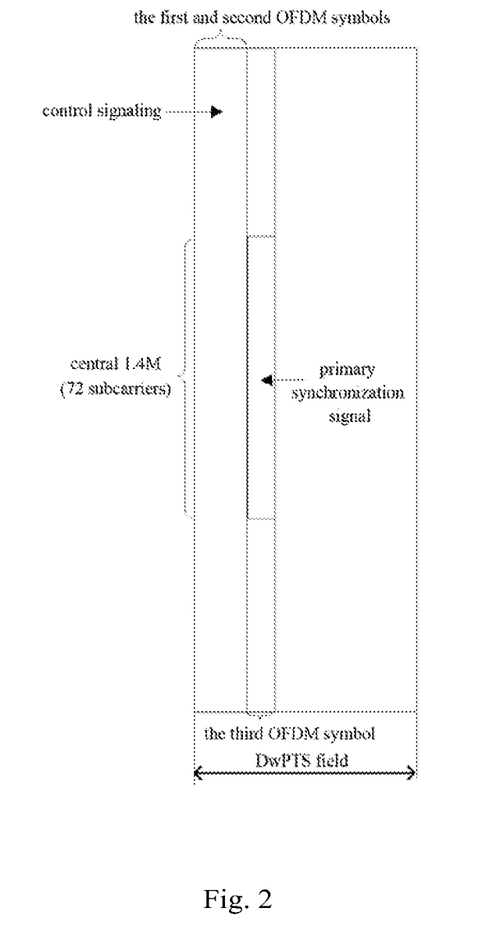
FIG. 2 is a schematic view of the DwPTS Field.

Wherein, the length of the Special Field DwPTS depends upon the configuration type, and the Subframe 0, the Subframe 5 and DwPTS are always reserved for downlink transmission. As shown in FIG. 2, a schematic view of the DwPTS Field, the downlink control signaling is transmitted in the first or first and second OFDM (Orthogonal Frequency Division Multiplexing) symbols in the DwPTS Field, and 72 central subcarriers on the third OFDM symbol are always used to transmit the primary synchronization signal for performing the Cell Search. Expect for the broadcast channel PBCH, any downlink data can occupy the idle resource on this Field for transmission, such as the carrying the physical downlink shared channel PDSCH and the physical multicast channel PMCH, etc.

At present, the LTE system has the following regulations on the downlink beam forming transmission:

The beam forming user uses the UE-specific reference signals to modulate the physical downlink shared channel PDSCH;

The UE-specific reference signals are merely mapped into the resource block for using the beam forming transmission;

The UE-specific reference signals only occupy one antenna port, i.e. the antenna port 5, to perform mapping;

The higher layer needs to inform the UE (User Equipment) whether the UE-specific reference signals are used, i.e. whether the beam forming transmission is performed;

The Cell-specific reference signals on the ports 0, 1, instead of the Cell-specific reference signals on the ports 2, 3 are reserved when the beam forming transmission is performed.

For the LTE TDD system, the Special Field DwPTS can also support the downlink beam forming transmission. However, the current LTE standard merely shows the mapping pattern of the UE-specific reference signals when the beam forming transmission is performed in the normal downlink Subframe, and does not define the mapping pattern of the UE-specific reference signals when the beam forming transmission is performed in the Special Field DwPTS.

SUMMARY OF THE INVENTION

The problem to be solved by the present invention is to provide a method, system and device for beam forming transmission, to solve the problem of performing the beam forming transmission in the Special Field DwPTS.

In order to accomplish the above objective, the present invention discloses a method for beam forming transmission, comprising the following steps: the eNB (evloved NodeB) maps the downlink data of the user and the UE-specific reference signals carried in the DwPTS Field for beam forming transmission according to the preset mapping structure, and performs the beam forming process; the eNB performs the resource mapping for the results of the beam forming process, primary synchronization signal, control signaling, Cell-specific reference signals and other user data to form the DwPTS Field data; and the eNB sends the DwPTS Field data to the UEs.

On another aspect, the present invention further provides a method for beam forming transmission. The UE receives the DwPTS Field data sent from the eNB, wherein the DwPTS Field data includes the beam forming processing results, primary synchronization signal, control signaling, Cell-specific reference signals and other user data, the beam forming processing results are obtained in the following manner: the eNB maps the downlink data of the user and the UE-specific reference signals carried in the DwPTS Field for beam forming transmission according to the preset mapping structure, and performs the beam forming process.

On another aspect, the present invention further provides a system for beam forming transmission, comprising an eNB and at least one UE, wherein the eNB is configured to map the downlink data of the user and the UE-specific reference signals carried in the DwPTS Field for beam forming transmission according to the preset mapping structure and perform the beam forming process, and to perform the resource mapping for the results of the beam forming process, primary synchronization signal, control signaling, Cell-specific reference signals and other user data to form the DwPTS Field data; and the UE is configured to receive the DwPTS Field data.

On another aspect, the present invention further provides an eNB, comprising a data processing module and a transmitting module, wherein the data processing module is configured to map the downlink data of the user and the UE-specific reference signals carried in the DwPTS Field for beam forming transmission according to the preset mapping structure and perform the beam forming process, and to perform the resource mapping for the results of the beam forming process, primary synchronization signal, control signaling, Cell-specific reference signals and other user data to form the DwPTS Field data; and the transmitting module is configured to transmit the DwPTS Field data obtained by the data processing module to the UEs.

Since the mapping pattern density of the UE-specific reference signals is relatively high when the beam forming transmission is performed in the normal downlink Subframe in the current specification, if the reference signals of the same number are used when the beam forming is performed on the DwPTS, the system overhead will be too high. Taking the problems of overhead, detection performance and practical application into comprehensive consideration, the above technical solutions are put forward in the present invention. The technical solutions in the present invention have the following advantages: the UE-specific reference signal mapping structure will not be additionally increased in the technical solutions of the present invention. By applying the technical solutions in the present invention, the beam forming transmission in the Special Field DwPTS can be realized, and the performance of the system can be improved, and at the same time, there is no need to introduce the new UE-specific reference signal mapping structure, which is simple to be realized.

DETAILED DESCRIPTIONS OF EMBODIMENTS

The embodiments of the present invention will be further described in detail with reference to the accompanying drawings and examples:

The present invention mainly provides a method, a system and a device for beam forming transmission so as to realize the performance of the beam forming transmission in the Special Field DwPTS. The technical solutions of the present invention can improve the system performance without introducing new UE-specific reference signal mapping structure, easy to realize.

In order to accomplish the objectives of the present invention, a method is provided for beam forming transmission, comprising the following steps: the eNB maps the downlink data of the user and the UE-specific reference signals carried in the DwPTS Field for beam forming transmission according to the preset mapping structure, and performs the beam forming process; the eNB performs the resource mapping for results of the beam forming process, primary synchronization signal, control signaling, Cell-specific reference signals and other user data to form the DwPTS Field data; and the eNB sends the DwPTS Field data to the UE.

Figure 3:
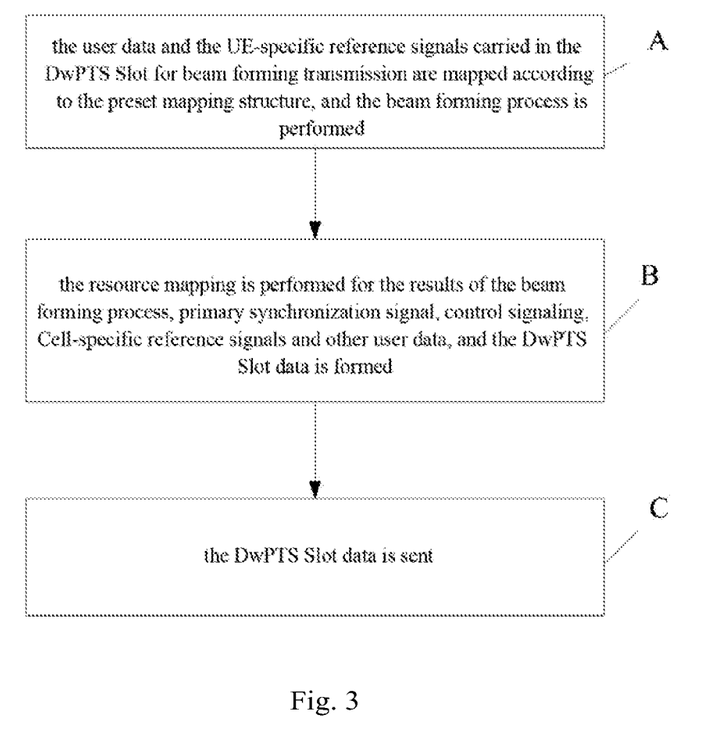
FIG. 3 is a flow chart of realizing the beam forming method.

As shown in FIG. 3, it is a flow chart of realizing the beam forming method and includes the following steps:

Step A, the user data and the UE-specific reference signals carried in the DwPTS Field for beam forming transmission are mapped according to the preset mapping structure, and the beam forming process is performed.

Specifically, in step A, the preset mapping structure depends upon the number of OFDM symbols carried in the DwPTS Field, and the different numbers of OFDM symbols carried are corresponding to different mapping structures.

Further, the number of OFDM symbols carried in the DwPTS Field depends upon the type of the cyclic prefix CP of the OFDM symbols and the specific configuration of the special subframe. Generally, the eNB determines the length T of the DwPTS Field and the length To of one OFDM symbol according to the type of the cyclic prefix CP and the specific configuration of the special subframe, so as to obtain the OFDM symbol number n carried in the DwPTS Field, wherein, n=T/To.

For instance, the mapping according to the preset mapping structure includes the following steps:

The eNB determines the UE-specific reference signal mapping structure according to the type of the cyclic prefix CP;

The eNB punctures the OFDM symbols after the n-th one in the UE-specific reference signal mapping structure and only reserves the first n OFDM symbols in the UE-specific reference signal mapping structure as the preset mapping structure;

The eNB maps the downlink data and the UE-specific reference signals according to the preset mapping structure on the physical resource block allocated to this user.

Step B, the resource mapping is performed for the results of the beam forming process, primary synchronization signal, control signaling, Cell-specific reference signals and other user data, and the DwPTS Field data is formed.

In step B, the DwPTS Field data conforming to the transmission format will be formed. In order to be compatible with the existing system, for example, the control signaling is transmitted on the first OFDM symbol or the first and second OFDM symbols in the DwPTS Field, and the primary synchronization signal is transmitted on the 72 central subcarriers of the third OFDM symbol in the DwPTS Field.

Step C, the DwPTS Field data is sent.

The eNB sends the DwPTS Field data that can be performed for beam forming transmission on the DwPTS Field to the UE. Correspondingly, the UE receives the data of the DwPTS Field having the beam forming transmission characteristics sent from the eNB On another aspect, therefore, the present invention further provides a method for beam forming transmission. The UE receives the DwPTS Field data sent from the eNB, wherein the DwPTS Field data includes the beam forming processing result, primary synchronization signal, control signaling, Cell-specific reference signals and other user data, and the beam forming processing results are obtained in the following manner: the eNB maps the downlink data of use and the UE-specific reference signals carried in the DwPTS Field for beam forming transmission according to the preset mapping structure, and performs the beam forming process.

As an embodiment of the above method, the preset mapping structure in the DwPTS Field data received by the UE depends upon the number of OFDM symbols carried in the DwPTS Field.

As an embodiment of the above method, the number of OFDM symbols carried in the DwPTS Field data received by the UE depends upon the type of the cyclic prefix CP of the OFDM symbols and the specific configuration of the special subframe. Specifically, the eNB determines the length T of the DwPTS Field and the length To of one OFDM symbol according to the type of the cyclic prefix CP and the specific configuration of the special subframe, so as to obtain the OFDM symbol number n carried in the DwPTS Slot, wherein, n=T/To.

carry 3, 8, 9 or 10 OFDM symbols. Regardless of the corresponding type, the downlink control signaling is transmitted in the first OFDM symbol or the first and second OFDM symbols in the DwPTS Field, and the 72 central subcarriers on the third OFDM symbol are always configured to transmit the primary synchronization signal for performing the Cell Search. Expect for the broadcast channel PBCH, any downlink data can occupy the idle resource on this Field for transmission, for example, carrying the physical downlink shared channel PDSCH, physical multicast channel PMCH, etc.

TABLE 1

Configurations of the Special Slot

| Configuration mode | Normal cyclic prefix | | | Extended cyclic prefix | | |
| --- | --- | --- | --- | --- | --- | --- |
| | DwPTS | GP | UpPTS | DwPTS | GP | UpPTS |
| 0 | 6592 × Ts | 21936 × Ts | 2192 × Ts | 7680 × Ts | 20480 × Ts | 2560 × Ts |
| 1 | 19760 × Ts | 8768 × Ts | | 20480 × Ts | 7680 × Ts | |
| 2 | 21952 × Ts | 6576 × Ts | | 23040 × Ts | 5120 × Ts | |
| 3 | 24144 × Ts | 4384 × Ts | | 25600 × Ts | 2560 × Ts | |
| 4 | 26336 × Ts | 2192 × Ts | | 7680 × Ts | 17920 × Ts | 5120 × Ts |
| 5 | 6592 × Ts | 19744 × Ts | 4384 × Ts | 20480 × Ts | 5120 × Ts | |
| 6 | 19760 × Ts | 6576 × Ts | | 23040 × Ts | 2560 × Ts | |
| 7 | 21952 × Ts | 4384 × Ts | | — | — | — |
| 8 | 24144 × Ts | 2192 × Ts | | — | — | — |

For instance, as an embodiment of the above method, realizing the preset mapping structure mapping in the DwPTS Field data received by the UE includes the following steps:

The eNB determines the UE-specific reference signal mapping structure according to the type of the cyclic prefix CP;

The eNB punctures the OFDM symbols after the n-th one in the UE-specific reference signal mapping structure and only reserves the first n OFDM symbols in the UE-specific reference signal mapping structure as the preset mapping structure;

The eNB maps the downlink data and the UE-specific reference signals according to the preset mapping structure on the physical resource block allocated to this user.

In order to be compatible with the existing system, the control signaling in the DwPTS Field data received by the UE is transmitted on the first OFDM symbol or the first and second OFDM symbols in the DwPTS Field, and the primary synchronization signal is transmitted on the 72 central subcarriers of the third OFDM symbol in the DwPTS Field.

Figure 4:
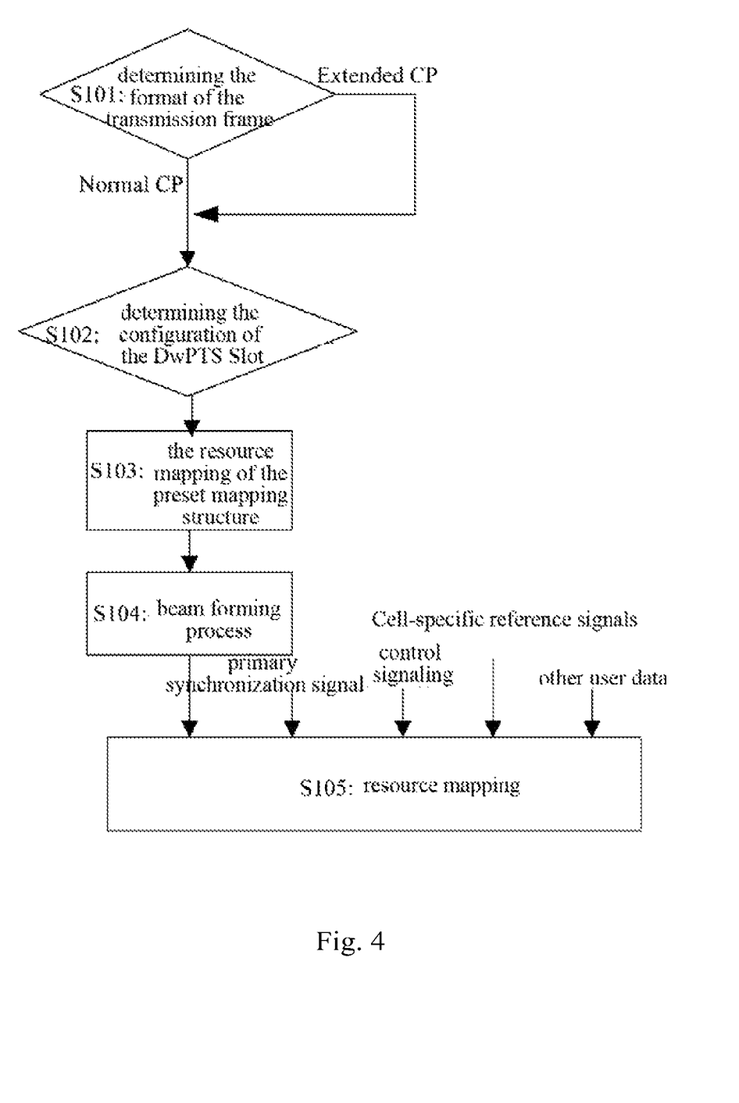
FIG. 4 is a flow chart of realizing the DwPTS Field beam forming process.

In order to further explain the present invention, as shown in FIG. 4, a flow chart of one specific embodiment of realizing the DwPTS Field beam forming process, the method for beam forming transmission in this embodiment specifically includes the following processes:

S101, determining the format of the transmission frame. Currently, as to the Special Field DwPTS in the LTE TDD system, its length can be set according to the configuration of the system. As an embodiment in the present invention, Table 1 sets forth various configurations of the DwPTS Field, the length of each OFDM symbol in the Normal CP Subframe is 2192×Ts, and the whole Subframe comprises 14 OFDM symbols in total; and each OFDM symbol in the Extended CP Subframe has a length of 2560×Ts, and the whole Subframe comprises 12 OFDM symbols in total. It can be obtained by calculation that, for the Subframe carrying the OFDM symbols of the Normal CP type, there are five different situations, namely, the DwPTS Field may carry 3, 9, 10, 11 or 12 OFDM symbols; for the Subframe carrying the Extended CP, there are four different situations, namely, the DwPTS Field may Therefore, the eNB firstly needs to determine the format of the transmission frame to judge whether the CP of the OFDM symbols carried in the current DwPTS Field is of the Normal type or of the Extended type since different CP types lead to different configurations of the DwPTS Field.

S102, determining the configuration of the special subframe. As an embodiment in the present invention, according to Table 1, after S101, the eNB determines the number of OFDM symbols carried in the DwPTS Field for different CP types. As an embodiment in the present invention, the eNB can determine the length T of the DwPTS Field and the length To of one OFDM symbol according to the type of the CP and the specific configuration of the DwPTS Field with reference to Table 1, thus the eNB can obtain the OFDM symbol number n carried in the DwPTS Field, wherein, n=T/To. The eNB maps the downlink data of the user and the UE-specific reference signals carried in the DwPTS Field for beam forming transmission according to the preset mapping structure, and performs the beam forming process.

Obviously, based on the common knowledge of the persons skilled in the art, the configurations of the DwPTS Field should not be limited to the modes in Table 1 of the present embodiment, while the configuration parameters of the DwPTS Field can be adjusted and the variations should be included in the scope of the present invention.

Figure 5:
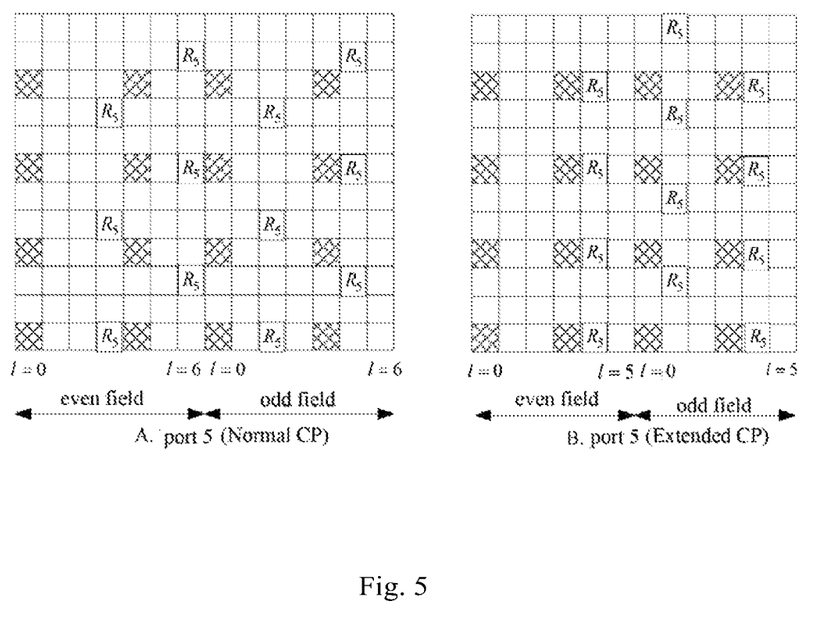
FIG. 5 shows the UE-specific reference signal mapping structures.

S103, the resource mapping of the preset mapping structure. The beam forming transmission is performed on the Special Field DwPTS, that is, the eNB maps the downlink data of the user and the UE-specific reference signals carried in the DwPTS Field for beam forming transmission according to the preset mapping structure, and performs the beam forming process. After S101, the eNB has determined the type of the cyclic prefix CP of the OFDM symbols in the DwPTS Field. As an embodiment in the present invention, different CP types have different mapping structures of the UE-specific reference signals, which refers to the UE-specific reference signal mapping structures used by the user when performing the beam forming transmission in the normal downlink Subframe. As in FIG. 5, it shows the UE-specific reference signal mapping structures. Wherein FIG. A on the left is the UE-specific reference signal mapping structure of the Normal CP, and FIG. B on the right is the UE-specific reference signal mapping structure of the Extended CP. Since the Cell-Specific reference signals are sent in each of the downlink Subframes and covering the whole system bandwidth in the frequency domain, across the whole downlink Subframes in the time domain, and the diamond portions of grids in the figures represent the Cell-Specific reference signals on the ports 0, 1. The UE-Specific reference signals are merely used in the data portion in the physical resource block allocated to the user for performing the beam forming, and when they are present in one Subframe simultaneously with the Cell-Specific reference signals, multiplexing will be performed in the manner as shown in FIG. 5, wherein $R_5$ represents the UE-Specific reference signal.

Therefore, the eNB can determine the mapping structure of the UE-Specific reference signals according to the type of the cyclic prefix CP.

After S102, the eNB judges and determines the OFDM symbol number n. The eNB punctures the OFDM symbols after the n-th one in the UE-specific reference signal mapping structure and only reserves the first n OFDM symbols in the corresponding UE-specific reference signal mapping structure as the preset mapping structure. After that, the eNB maps the downlink service data of the user and the UE-specific reference signals for beam forming transmission according to the mapping structure remained after being punctured on the physical resource block allocated to this user.

Figure 6:
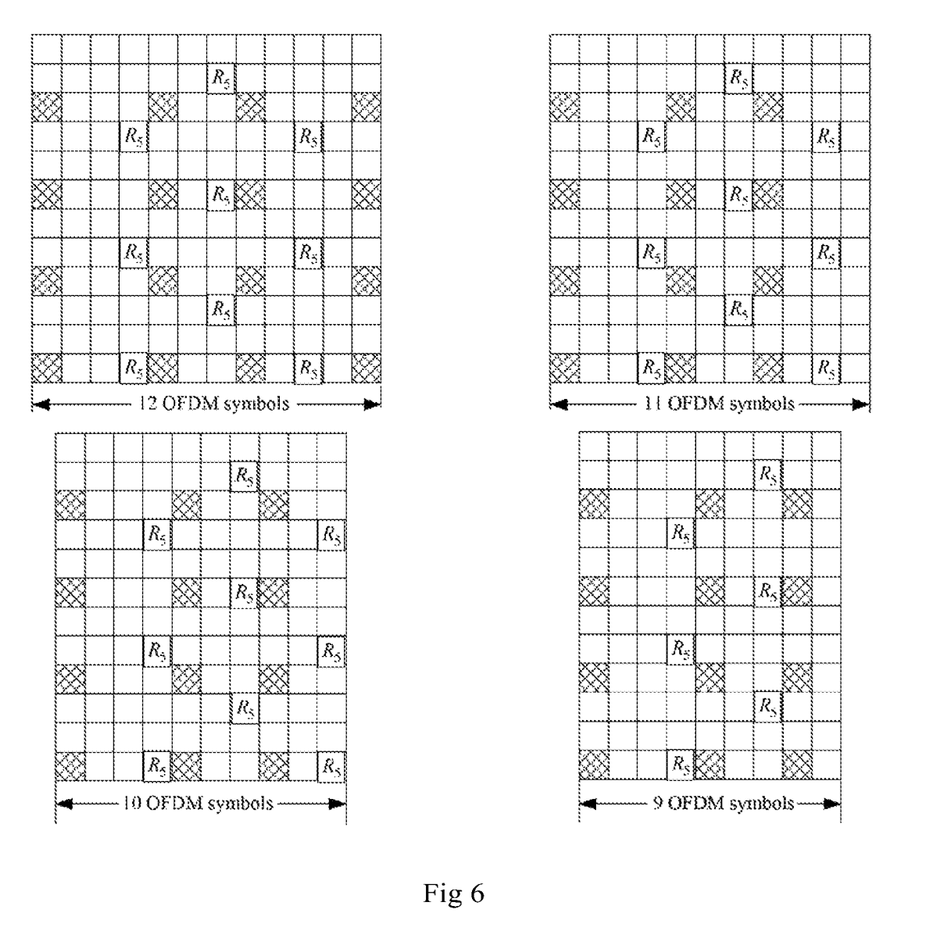
FIG. 6 shows the mapping structures of different configurations of the DwPTS Field of the Normal CP.
Figure 7:
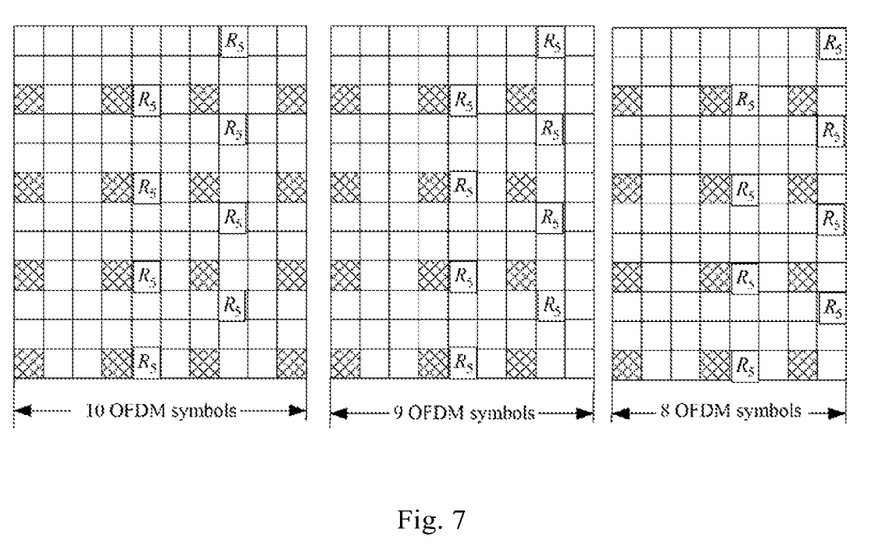
FIG. 7 shows the mapping structures of different configurations of the DwPTS Field of the Extended CP.

As an embodiment in the present invention, as in FIG. 6, it shows the mapping structures of different configuration modes of the DwPTS Field of the Normal CP, in which they are the mapping structures remaining after the redundant OFDM symbols being punctured when the DwPTS Field carries 12, 11, 10 or 9 OFDM symbols, respectively. As in FIG. 7, it shows the mapping structures of different configuration modes of the DwPTS Field of the Extended CP, in which they are the mapping structures remaining after the redundant OFDM symbols being punctured when the DwPTS Field carries 10, 9 or 8 OFDM symbols, respectively. In the figures, the diamond portions of grids represent the Cell-Specific reference signals, and $R_5$ represents the UE-Specific reference signals. Therefore, the OFDM symbols being punctured include not only the resource units carrying the data symbols but also possibly the resource units carrying the UE-Specific reference signals.

S104, beam forming processing. For the downlink data of the user and the UE-specific reference signals carried in the DwPTS Field for beam forming transmission, after S103, the eNB performs the beam forming on the downlink data and the UE-specific reference signals using the same beam forming matrix and obtains the beam forming data.

S105, resource mapping. As an embodiment in the present invention, the system allocates the resource to the user with the physical resource block as a unit, and each physical resource block comprises 12 subcarriers. The eNB performs the resource mapping on the beam forming data, primary synchronization signal, control signaling, Cell-specific reference signals and other user data obtained through the shaping matrix and forms the DwPTS Field data, in which the control signaling is transmitted on the first OFDM symbol or the first and second OFDM symbols in the DwPTS Field, and the primary synchronization signal is transmitted on the 72 central subcarriers of the third OFDM symbol in the DwPTS Field. The data of plural downlink users may exist in the DwPTS Field, therefore, other user data can be transmitted on several physical resource blocks based on the beam forming transmission solutions mentioned above in the present invention. Obviously, other user data may also be transmitted on other physical resource blocks without using the beam forming.

Obviously, based on the common knowledge of the person skilled in the art, the mapping structures of the UE-specific reference signals should not be limited to the modes shown in the present embodiment, while the mapping structures of the UE-specific reference signals may be adjusted and the technical solutions in the present invention are still applicable thereto. The variations should be included in the scope of the present invention.

Figure 8:
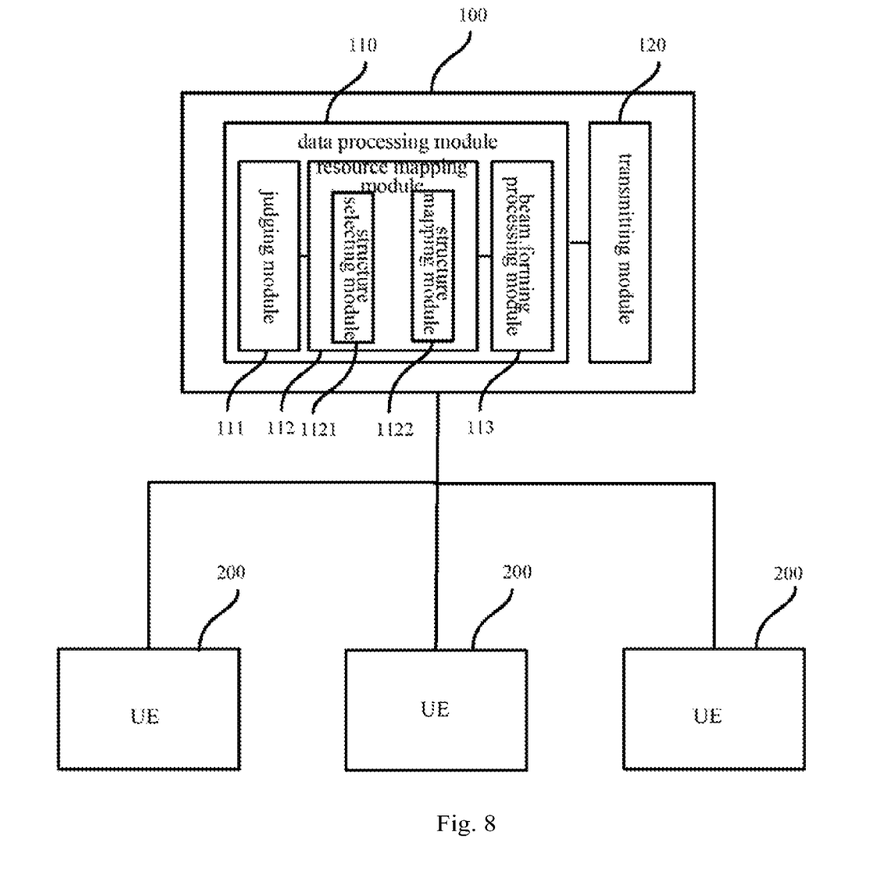
FIG. 8 shows a systematic functional structure of the beam forming transmission.

As shown in FIG. 8, it is a systematic functional structure view of the beam forming transmission provided in the present invention. The system comprises an eNB and at least one UE, wherein the eNB 100 is configured to map the downlink data of the user and the UE-specific reference signals carried in the DwPTS Field for beam forming transmission according to the preset mapping structure to perform the beam forming process, and to perform the resource mapping for the results of the beam forming process, primary synchronization signal, control signaling, Cell-specific reference signals and other user data to form the DwPTS Field data; and the UE 200 is configured to receive the DwPTS Field data.

Wherein the eNB 100 in the present invention comprises a data processing module 110 and a transmitting module 120. The data processing module 100 is configured to map the downlink data of the user and the UE-specific reference signals carried in the DwPTS Field for beam forming transmission according to the preset mapping structure to perform the beam forming process, and to perform the resource mapping on the results of the beam forming process, primary synchronization signal, control signaling, Cell-specific reference signals and other user data to form the DwPTS Field data; and the transmitting module 120 is configured to transmit the DwPTS Field data obtained by the data processing module 110 to the UE 200.

Preferably, the data processing module 110 further comprises a judging module 111, a resource mapping module 112 and a beam forming processing module 113. The judging module 111 is configured to obtain the number of OFDM symbols carried in the DwPTS Field to determine the length T of the DwPTS Field and the length To of one OFDM symbol according to the type of the cyclic prefix CP of the OFDM symbols and the specific configuration of the special subframe, so as to obtain the OFDM symbol number n carried by the DwPTS Field, wherein, n=T/To; the resource mapping module 112 is configured to map the downlink data of the user and the UE-specific reference signals carried in the DwPTS Field for beam forming transmission according to the preset mapping structure, so as to obtain the beam forming process results through the beam forming processing module 113, to perform the resource mapping for the beam forming process result, primary synchronization signal, control signaling, Cell-specific reference signals and other user data, and to form the DwPTS Field data; and the beam forming processing module 113 is configured to perform the beam forming process on the downlink data and the UE-specific reference signals that are mapped by the resource mapping module 112 according to the preset mapping structure.

Preferably, the resource mapping module 112 comprises a structure selecting module 1121 and a structure mapping module 1122. The structure selecting module 1121 is configured to determine the UE-specific reference signal mapping structure according to the type of the cyclic prefix CP; and the structure mapping module 1122 is configured to puncture the OFDM symbols after the n-th one in the UE-specific reference signal mapping structure and to only reserve the first n OFDM symbols in the UE-specific reference signal mapping structure as the preset mapping structure, and to map the downlink service data and the UE-specific reference signals according to the preset mapping structure on the physical resource block allocated to this user.

Ordinary persons skilled in the art would comprehend that all or a part of the steps in the methods of the above embodiments can be accomplished by related hardware commanded by the program that can be stored in a computer-readable memory medium. When the program is executed, it includes one or a combination of the steps in the method embodiments.

In addition, the functional units in respective embodiments of the present invention may be integrated in one processing module, or the units can be physically and individually present, or two or more units are integrated in one module. The integrated modules above can be implemented not only in the form of hardware but also in the form of functional software module. The integrated modules, if implemented in the form of functional software module and sold or used as an independent product, also may be stored in a computer-readable memory medium.

The memory media mentioned above may be a read-only memory, magnetic disk or optical disk, etc.

The above mentioned is merely the preferred embodiments of the present invention. It should be indicated that for ordinary persons skilled in the art, various improvements and modifications may be made without departing from the principle of the present invention, and all the improvements and modifications also should be regarded as the protection scope of the present invention.

What is claimed is:

1. A method for beam forming transmission, comprising the following steps:
   an eNB mapping downlink data of a user and UE-specific reference signals carried in a DwPTS Field for beam forming transmission according to a preset mapping structure, and performing a beam forming process;
   the eNB performing a resource mapping for results of the beam forming process, primary synchronization signal, control signaling, Cell-specific reference signals and other user data to form the DwPTS Field data; and
   the eNB sending the DwPTS Field data to the UE,
   wherein the preset mapping structure depends upon the number of OFDM symbols carried in the DwPTS Field, and
   wherein the number of OFDM symbols carried in the DwPTS Field depends upon the type of a cyclic prefix CP of the OFDM symbols and the specific configuration of the special subframe, and the eNB determines a length T of the DwPTS Field and a length To of one OFDM symbol according to the type of the CP and the specific configuration of the DwPTS Field, so as to obtain the number n of OFDM symbols carried in the DwPTS Field, wherein, n=T/To.

2. The method for beam forming transmission according to claim 1, wherein the mapping according to the preset mapping structure comprising the following steps:
   the eNB determining a UE-specific reference signal mapping structure according to the type of the CP;
   the eNB punctures the OFDM symbols after the n-th one in the UE-specific reference signal mapping structure and only reserving the first n OFDM symbols in the UE-specific reference signal mapping structure as the preset mapping structure; and
   the eNB mapping the downlink data and the UE-specific reference signals according to the preset mapping structure on a physical resource block allocated to the user.

3. The method for beam forming transmission according to claim 2, wherein the control signaling is transmitted on the first OFDM symbol or the first and the second OFDM symbols in the DwPTS Field, and the primary synchronization signal is transmitted on the 72 central subcarriers of the third OFDM symbol in the DwPTS Field.

4. A method for beam forming transmission, wherein an UE receives DwPTS Field data sent from an eNB, wherein the DwPTS Field data include beam forming processing results, primary synchronization signal, control signaling, Cell-specific reference signals and other user data, and the beam forming processing results are obtained in the following manner: the eNB mapping downlink data of user and UE-specific reference signals carried in the DwPTS Field for beam forming transmission according to a preset mapping structure, and performing a beam forming process,
   wherein the preset mapping structure depends upon the number of OFDM symbols carried in the DwPTS Field, and
   wherein the number of OFDM symbols carried in the DwPTS Field depends upon the type of CP of the OFDM symbols and the specific configuration of the special subframe, and the eNB determines a length T of the DwPTS Field and a length To of one OFDM symbol according to the type of the CP and the specific configuration of the special subframe, so as to obtain the number n of OFDM symbols carried in the DwPTS Field, wherein, n=T/To.

5. The method for beam forming transmission according to claim 4, wherein the mapping according to the preset mapping structure includes the following steps:
   the eNB determining a UE-specific reference signal mapping structure according to the type of the CP;
   the eNB punctures the OFDM symbols after the n-th one in the UE-specific reference signal mapping structure and only reserving the first n OFDM symbols in the UE-specific reference signal mapping structure as the preset mapping structure; and
   the eNB mapping the downlink data and the UE-specific reference signals according to the preset mapping structure on a physical resource block allocated to the user.

6. The method for beam forming transmission according to claim 5, wherein the control signaling is transmitted on the first OFDM symbol or the first and the second OFDM symbols in the DwPTS Field, and the primary synchronization signal is transmitted on the 72 central subcarriers of the third OFDM symbol in the DwPTS Field.

7. A system for beam forming transmission, comprising an eNB and at least one UE,
   the eNB being configured to map downlink data of a user and UE-specific reference signals carried in a DwPTS Field for beam forming transmission according to a preset mapping structure and performing a beam forming process, and to perform a resource mapping on results of the beam forming process, primary synchronization signal, control signaling, Cell-specific reference signals and other user data to form the DwPTS Field data; and
   the UE being configured to receive the DwPTS Field data,
   wherein the preset mapping structure depends upon the number of OFDM symbols carried in the DwPTS Field, and
   wherein the number of OFDM symbols carried in the DwPTS Field depends upon the type of CP of the OFDM symbols and the specific configuration of the special subframe, and the eNB determines a length T of the DwPTS Field and a length To of one OFDM symbol according to the type of the CP and the specific configuration of the special subframe, so as to obtain the number n of OFDM symbols carried in the DwPTS Field, wherein, n=T/To.

8. An eNB, comprising a data processing module and a transmitting module, the data processing module being configured to map downlink data of a user and UE-specific reference signals carried in a DwPTS Field for beam forming transmission according to a preset mapping structure and perform a beam forming process, and to perform a resource mapping on results of the beam forming process, primary synchronization signal, control signaling, Cell-specific reference signals and other user data to form the DwPTS Field data; and the transmitting module being configured to transmit the DwPTS Field data obtained by the data processing module to the UE, wherein the data processing module comprises a judging module, a resource mapping module and a beam forming processing module, the judging module being configured to obtain an OFDM symbol number carried in the DwPTS Field to determine a length T of the DwPTS Field and a length To of one OFDM symbol according to the type of a CP of the OFDM symbols and a specific configuration of the special subframe, so as to obtain an OFDM symbol number n carried in the DwPTS Field, wherein, n=T/To;

the resource mapping module being configured to map the downlink data of the user and the UE-specific reference signals carried in the DwPTS Field for beam forming transmission according to the preset mapping structure and obtain the results of the beam forming process with the beam forming processing module, and to perform the resource mapping on the results of the beam forming process, primary synchronization signal, control signaling, Cell-specific reference signals and other user data to form the DwPTS Field data; and the beam forming processing module being configured to perform the beam forming process on the downlink service data and the UE-specific reference signals that are mapped by the resource mapping module according to the preset mapping structure.

9. The eNB according to claim 8, wherein the resource mapping module further comprises a structure selecting module and a structure mapping module, the structure selecting module being configured to determine a UE-specific reference signal mapping structure according to the type of the CP; and the structure mapping module being configured to puncture the OFDM symbols after the n-th one in the UE-specific reference signal mapping structure and to only reserve first n OFDM symbols in the UE-specific reference signal mapping structure as the preset mapping structure, and to map the downlink data and the UE-specific reference signals according to the preset mapping structure on a physical resource block allocated to the user.

* * * * *

UNITED STATES PATENT AND TRADEMARK OFFICE
CERTIFICATE OF CORRECTION

| | | |
|---|---|---|
| PATENT NO. | : 8,526,295 B2 | Page 1 of 1 |
| APPLICATION NO. | : 12/995060 | |
| DATED | : September 3, 2013 | |
| INVENTOR(S) | : Yanan Lin et al. | |

It is certified that error appears in the above-identified patent and that said Letters Patent is hereby corrected as shown below:

On the Title Page, (Item 73) Assignee:
    Delete "Datang Mobile Communication Equipment Co., Ltd." and insert -- China Academy of
    Telecommunications Technology --, therefor.

Signed and Sealed this
Sixteenth Day of September, 2014

Michelle K. Lee
*Deputy Director of the United States Patent and Trademark Office*